(12) United States Patent
Braden

(10) Patent No.: US 10,011,507 B2
(45) Date of Patent: Jul. 3, 2018

(54) CHEMICAL DELIVERY SYSTEM FOR WATER OR EFFLUENT TREATMENT

(71) Applicant: Michael R. Braden, Columbus, TX (US)

(72) Inventor: Michael R. Braden, Columbus, TX (US)

( * ) Notice: Subject to any disclaimer, the term of this patent is extended or adjusted under 35 U.S.C. 154(b) by 34 days.

(21) Appl. No.: 15/050,083

(22) Filed: Feb. 22, 2016

(65) Prior Publication Data
US 2016/0251242 A1    Sep. 1, 2016

Related U.S. Application Data

(60) Provisional application No. 62/121,348, filed on Feb. 26, 2015.

(51) Int. Cl.
| | | |
|---|---|---|
| *C02F 1/68* | (2006.01) | |
| *C02F 1/76* | (2006.01) | |
| *G05D 11/00* | (2006.01) | |
| *C02F 1/50* | (2006.01) | |

(52) U.S. Cl.
CPC ............ *C02F 1/686* (2013.01); *G05D 11/008* (2013.01); *C02F 1/50* (2013.01); *C02F 1/76* (2013.01); *C02F 2303/04* (2013.01)

(58) Field of Classification Search
CPC .... C02F 1/50; C02F 1/686; C02F 1/76; C02F 2303/04; G05D 11/006; G05D 11/008
See application file for complete search history.

(56) References Cited

U.S. PATENT DOCUMENTS

| | | | |
|---|---|---|---|
| 3,996,139 A | 12/1976 | Prince et al. | |
| 4,019,983 A | 4/1977 | Mandt | |
| 4,100,073 A | 7/1978 | Hopcroft | |
| 4,333,833 A | 6/1982 | Longley | |
| 5,269,443 A * | 12/1993 | Lancaster | ........... B01F 15/0416 222/207 |
| 5,350,512 A | 9/1994 | Tang | |
| 5,405,540 A | 4/1995 | Tang | |
| 6,029,688 A * | 2/2000 | Kaufman | ............. G05D 11/006 137/565.12 |
| 6,183,630 B1 | 2/2001 | Reeves | |
| 6,627,071 B1 | 9/2003 | Braden | |
| 6,932,912 B2 | 8/2005 | Chaffin | |

FOREIGN PATENT DOCUMENTS

WO    WO 9404257 A1 *    3/1994    .......... B01F 15/0416

* cited by examiner

*Primary Examiner* — David C Mellon
(74) *Attorney, Agent, or Firm* — Gunn, Lee & Cave, PC

(57) ABSTRACT

A system for delivering disinfectant or other chemicals to effluent or water within a containment vessel, such as a wastewater storage tank. The invention includes a mounting bracket or housing; a rotor rotationally connected to the mounting bracket; a shaft connecting the rotor to the mounting bracket; a pump connected to the shaft, the pump having a casing and a rotor assembly; a container; and an tube having a first end within the container and a second end outside the container, a portion of the tube positioned within the pump and in contact with the rotor assembly.

4 Claims, 8 Drawing Sheets

CHEMICAL DELIVERY SYSTEM FOR WATER OR EFFLUENT TREATMENT

CROSS REFERENCES TO RELATED APPLICATIONS

This application claims priority to and the benefit of U.S. provisional application Ser. No. 62/121,348, filed Feb. 26, 2015, which is incorporated by reference/

FEDERALLY-SPONSORED RESEARCH

Not applicable.

BACKGROUND OF THE INVENTION

1. Field of the Invention

This invention relates generally to a chemical delivery system that may be used, for example, to deliver a chemical (e.g., sodium hypochlorite, algaecide) to water or effluent within a containment vessel.

2. Description of the Related Art

Chlorinators, which use either solid or liquid disinfectants, are known to the prior art. Illustrative of chlorinators using solid disinfectants are U.S. Pat. No. 6,627,071 issued to Braden on Sep. 30, 2003; U.S. Pat. No. 6,932,912 issued to Chaffin on Aug. 23, 2005; U.S. Pat. No. 6,183,630 issued to Reeves on Feb. 6, 2001; U.S. Pat. No. 4,100,073 issued to Hopcroft on Jul. 11, 1978; U.S. Pat. No. 5,350,512 issued to Tang on Sep. 27, 1994; and U.S. Pat. No. 5,405,540 issued to Tang on Apr. 11, 1995. Illustrative of chlorinators using liquid disinfectants are U.S. Pat. No. 4,333,833 issued to Longley et al. on Jun. 8, 1982; U.S. Pat. No. 4,019,983 issued to Mandt on Apr. 26, 1977; and U.S. Pat. No. 3,996,139 issued to Prince et al. on Dec. 7, 1976.

Disinfection is widely used as part of wastewater treatment systems. In practice, a disinfectant such as chlorine is introduced at a point in the wastewater treatment system after which sufficient time, either by flow into a storage tank or through a region of flow, passes to permit the disinfectant to effectively disinfect the contaminant-bearing wastewater. The amount of disinfectant added to the wastewater is referred to as the "dosage," and is usually expressed as milligrams per liter (mg/l) or parts per million (ppm). The amount of disinfectant necessary to disinfect a particular volume of wastewater is referred to as the "demand."

The reaction between the disinfectant and the contaminants is typically not instantaneous but is instead time dependent. In order to obtain adequate disinfection, the mixing of wastewater and disinfectant should be completed in the shortest time possible, ideally a fraction of a second. The amount of disinfectant remaining in the wastewater at the time of measurement is referred to as the "residual." The residual is therefore determined by the demand subtracted from the dosage.

Prior art chlorinators, whether using a liquid or solid disinfectant, typically mix the disinfectant with the wastewater during the flow of wastewater through the wastewater treatment system. In the case of chlorinators using a solid disinfectant, such as those disclosed in U.S. Pat. No. 6,183,630 issued to Reeves on Feb. 6, 2001; U.S. Pat. No. 4,100,073 issued to Hopcroft on Jul. 11, 1978; U.S. Pat. No. 5,350,512 issued to Tang on Sep. 27, 1994; and U.S. Pat. No. 5,405,540 issued to Tang on Apr. 11, 1995, mixing occurs by wastewater flow about a plurality of disinfectant tablets. In such systems the disinfectant is mixed at a rate that is dependent on the surface area of the tablet in contact with the wastewater, the density of the wastewater and the flow rate of the wastewater, among other variables. In the case of chlorinators using a liquid disinfectant, such as U.S. Pat. No. 4,333,833 issued to Longley et al. on Jun. 8, 1982, mixing occurs at a contactor in the flowline wherein disinfectant fluid is drawn from a reservoir by pressure differential. In such systems the amount of chlorine combined with the wastewater varies with the flow rate of the wastewater and wastewater density.

U.S. Pat. No. 6,627,071 issued to Braden on Sep. 20, 2003 teaches a chlorinator that discharges a uniform volume of disinfectant, but requires a disinfectant tank and a core wall defining a core space and an annular space in the disinfectant tank interior. A check valve limits flow during operation of the pump. After the pump deactivates, the check valve opens to reestablish the quantity of disinfectant fluid within the disinfectant tank.

Many prior-art chlorinators that use liquid disinfectant require an effluent discharge pump to displace fluid through a venturi. That displacement creates a suction that draws a disinfectant into piping where it mixes with the effluent. Such pumps, however, are a significant cost element of such systems, both in terms of the upfront cost of the system and in terms of repairing or replacing the pumps when necessary. Moreover, discharge pumps are not used in all septic systems, meaning that systems such as those described by U.S. Pat. No. 6,627,071 and U.S. Pat. No. 6,932,912 have limited applicability.

BRIEF SUMMARY

The present invention provides a system for delivering a chemical (e.g., disinfectant) to effluent or water within a containment vessel without the use of an effluent discharge pump. The invention includes a mounting bracket or housing; a rotor rotationally connected to the mounting bracket or housing, the rotor comprising a plurality of blades defining chambers; a shaft connecting the rotor to the mounting bracket or housing; a pump connected to the shaft, the pump having a casing and a rotor assembly; a container; and an elastomeric tube having a first end within the container and a second end outside the container, a portion of the elastomeric tube positioned within the pump and in contact with the rotor assembly.

One advantage of the invention is that disinfectant contact is limited to the container and the inner wall of the tubing. In many cases, the chemical is corrosive (e.g., sodium hypochlorite), which might damage components of the system not manufactured from polyvinyl chloride or similar materials. In this invention, however, only the container and tubing need be manufactured from such materials.

In wastewater treatment, another advantage relative to venturi-based systems (such as U.S. Pat. No. 6,627,071 and U.S. Pat. No. 6,932,912) is more reliably ensuring sufficient contact of disinfectant with all of the effluent. Because the disinfectant is delivered contemporaneously with effluent entering in the tank, this generally leads to longer contact time for more of the effluent. In venturi-based systems, however, depending on the timing and amounts of prior doses delivered to effluent volume contained within a tank, a portion of the effluent being discharged may ultimately only contact disinfectant as it passes the suction inlet of the venturi device during discharge.

DETAILED DESCRIPTION OF CERTAIN EMBODIMENTS

Figure 1:
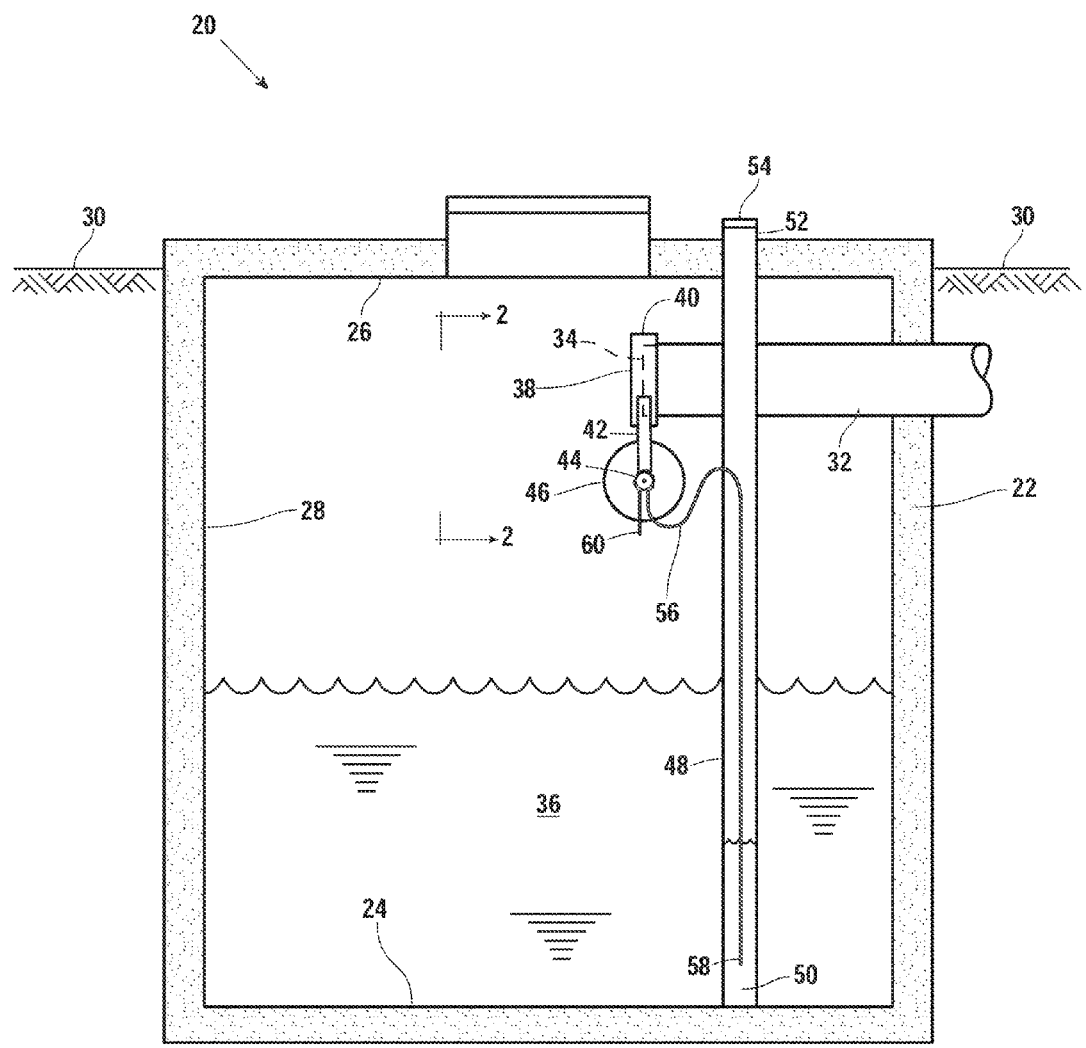
FIG. 1 is side view of one embodiment of the invention.

FIG. 1 shows an embodiment 20 of the invention, which includes a storage tank 22 having a bottom 24, a top wall 26, and a sidewall 28. The tank 22 is located substantially below a ground surface 30. An effluent pipe 32 is connected to an effluent source (e.g., a house or a business) and has a terminal end 34 within the tank 22. Effluent 36 periodically exits the pipe 32 and accumulates within tank.

Either periodically or when the volume of effluent 36 reaches a threshold volume, the effluent 36 may be pumped from the tank 22 through a discharge pipe to a spray field. Alternatively, the effluent 36 may migrate to an adjacent chamber (not shown) through an opening in the tank 22, from which it is disbursed through piping into a nearby leach field. These and other methods of removing effluent from a septic system are well-known to those skilled in the art and are mentioned for context.

A mounting bracket 38 is attached to the pipe 32 proximal to the terminal end 34. The mounting bracket 38 includes a ring 40 and arms 42 connected to the ring 40 and extending toward the tank bottom 24. The ring 40 is sized to fit snugly around the pipe 32. A peristaltic pump 44 is mounted to one of the arms 42. A rotor 46 is rotationally connected to the arms 42 about a rotational axis. The pipe end 34 is aligned with a vertical plane intersecting the rotational axis of the rotor 46. The pump 44 of this embodiment is a KAMOER® brand mini peristaltic pump.

An elongated container 48 made from PVC is partially within the tank 22. The container 48 holds a volume of liquid disinfectant 50, such as sodium hypochlorite. A portion of the container 48 extends through the tank 22 and has an end 52 outside of the tank 22. A cap 54 is attached to the end 52. The cap 54 may be removed to provide access to the inside of the container 48 so it can be filled with additional disinfectant.

An elastomeric PHARMED® BPT tube 56 extends through an opening in the sidewall of the container 48. The tube 56 has a first end 58 within the container 48 and disposed within the disinfectant 50. The tube 56 has a second end 60 within the tank 22 outside of the container 48 and above the effluent volume 36. A portion of the tube 56 is positioned within the peristaltic pump 44.

Figure 2:
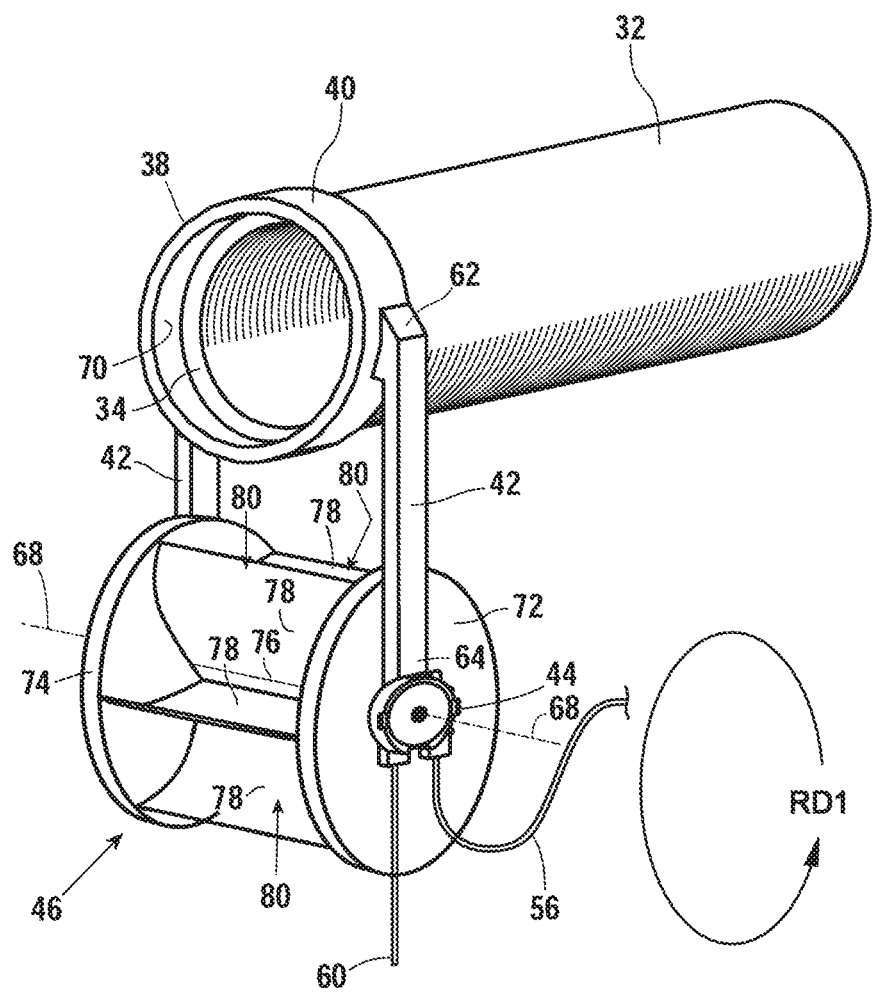
FIG. 2 is an oblique projection of the inlet pipe and rotor of the embodiment described with reference to FIG. 1, from view 2-2 in FIG. 1.
Figure 3:
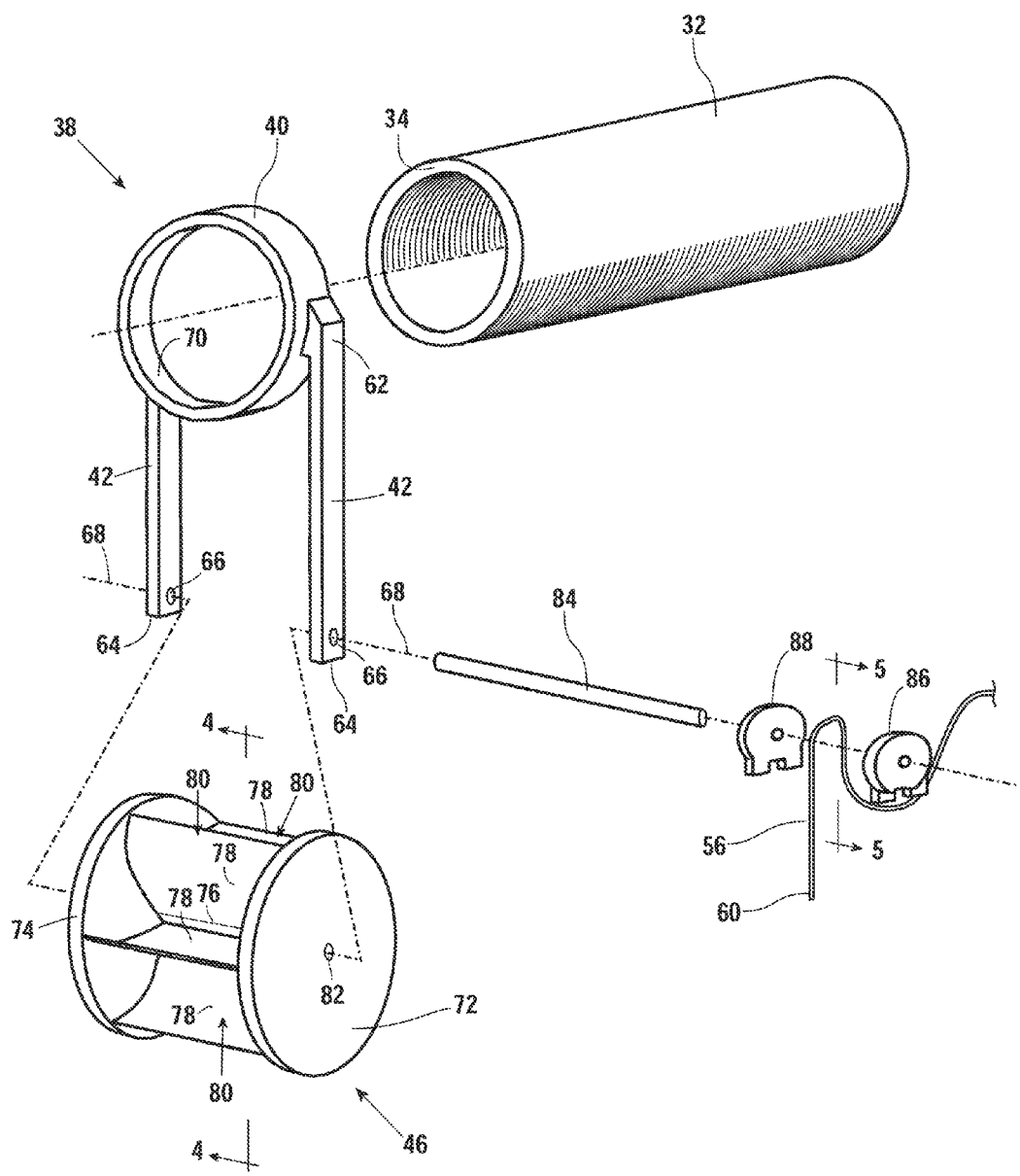
FIG. 3 is an assembly view of FIG. 2.

Referring to FIGS. 2-3, the mounting bracket 38 includes the ring 40 and two arms 42 extending from sides of the ring 40. Each arm 42 has a connected end 62 proximal to the ring 40 and a distal free end 64. Cylindrical bearing surfaces 66 (see FIG. 3) extend between opposing sides of each arm 42 and are longitudinally aligned along the rotational axis 68.

The ring 40 has an inner cylindrical surface 70 sized to closely fit around the outer surface of the pipe 32. The ring 40 is connected to the pipe 32 with an interference fit between the inner surface 70 and the pipe 32, but a bonding agent or fastener (e.g., set screw) may also be used. In this embodiment, the mounting bracket 38 is a single injection-molded body, but may alternatively comprise the arms 42 being connected to a separately-made ring 40 using fasteners or an adhesive.

The rotor 46 includes first and second cylindrical ends 72, 74, a central body 76, and six blades 78 extending radially outward from the body 76. Each blade 78 extends between the first and second end 70, 72. The rotor 46 has a cylindrical shell of revolution about the axis 68. The blades 78 are equally spaced from one another to define six chambers 80, each having an identical volume. Each chamber 80 is bounded by pairs of adjacent blades, 78, the ends 70, 72 and the outer boundary of the shell of revolution of the rotor 46.

Referring specifically to FIG. 3, a cylindrical bearing surface 82 extends through the body 76 between opposing ends 72, 74 of the rotor 46 around the rotational axis 68. The rotor 46 is connected to the mounting bracket 38 with a shaft 84 that extends through the arms 42 and rotor body 76, thus contacting the bearing surfaces 66, 82. The shaft 84 is connected to the rotor 46 with an interference fit, but is easily rotatable relative to the bearing surfaces 66 of the arms 42.

The pump 44 includes a casing 86 and a cover 88 fastenable to the casing 86. In this embodiment, the cover 88 is attached to one of the arms 42 and has an opening axially aligned with the axis 68.

Figure 4:
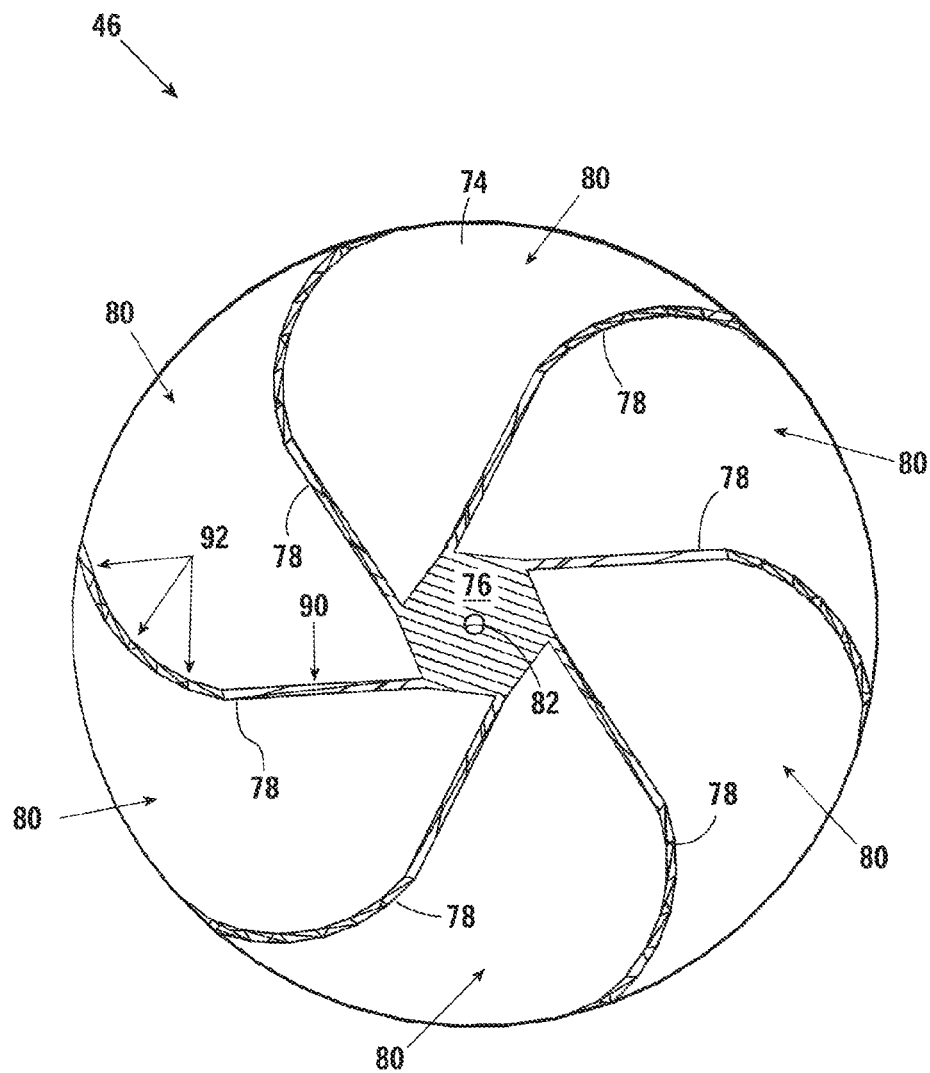
FIG. 4 is a sectional view of the rotor of the first embodiment through plane 4-4 of FIG. 2.

Referring to FIG. 4, each blade 78 extends generally radially outward from the body 76. The body 76 has an uniformly hexagonal cross section between the ends 72 (see FIG. 3), 74. A radially-inward portion 90 of each blade 78 is generally planar. A radially-outward portion of each blade 78 is continuously curved 92.

Figure 5:
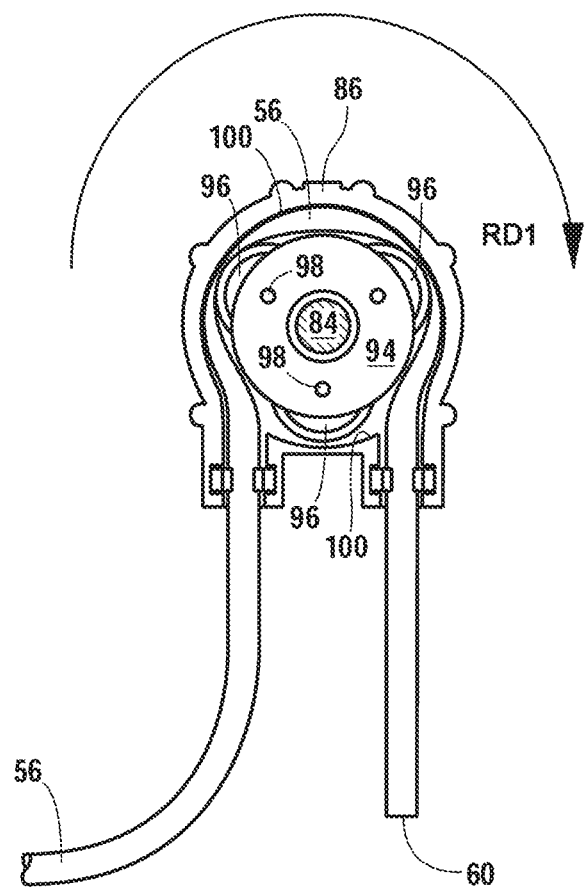
FIG. 5 is a side elevation of the peristaltic pump with the rotor assembly.

Referring to FIG. 5, the pump casing 86 houses a rotor assembly comprising a rotor 94 and three rollers 96 attached to the rotor 94 with axles 98. The rotor assembly is not fixed to the casing 86; rather, movement of the rotor assembly is limited by the inner walls 100 of the casing 86. The shaft 84 is fixed to the pump rotor 94. Part of the elastomeric tube 56 is positioned radially between the rollers 96 and the walls 100, which causes the tube 56 to be "pinched" against the walls 100 by the rollers 96 at the points of contact.

Operation of the embodiment is described with reference to FIG. 2. As effluent exits the pipe 32 into tank 22, at least a portion of the effluent flows onto the rotor 46. With time, Effluent accumulates within upward-facing (or partially upward-facing) chambers 80 of the rotor 46. Eventually, a sufficient amount of effluent will accumulate within the upward-facing chambers 80 such that the weight of the accumulated effluent will cause the rotor 46 to turn in a first rotational direction RD1 around the rotational axis 68. In addition, the momentum of the effluent flow may also cause the rotor 46 to turn. Rotation of the rotor 46 causes rotation of the shaft 84 (see FIG. 3) in the same rotational direction RD1. Rotation of the rotor 46 need not be continuous with the egress of effluent on the pipe 32.

Referring to FIG. 5, because of connection of the shaft 84 to the pump 44, rotation of the rotor 46 drives the pump rotor 94 causing the rollers 96 move in circular path within the pump casing 86. Referring back to FIG. 1, this action induces disinfectant flow from the container 48 through the tube 56. The disinfectant 50 is then dispensed from the second end 60 of the tube 56 into the effluent volume 36 held within the tank 22.

Figure 6:
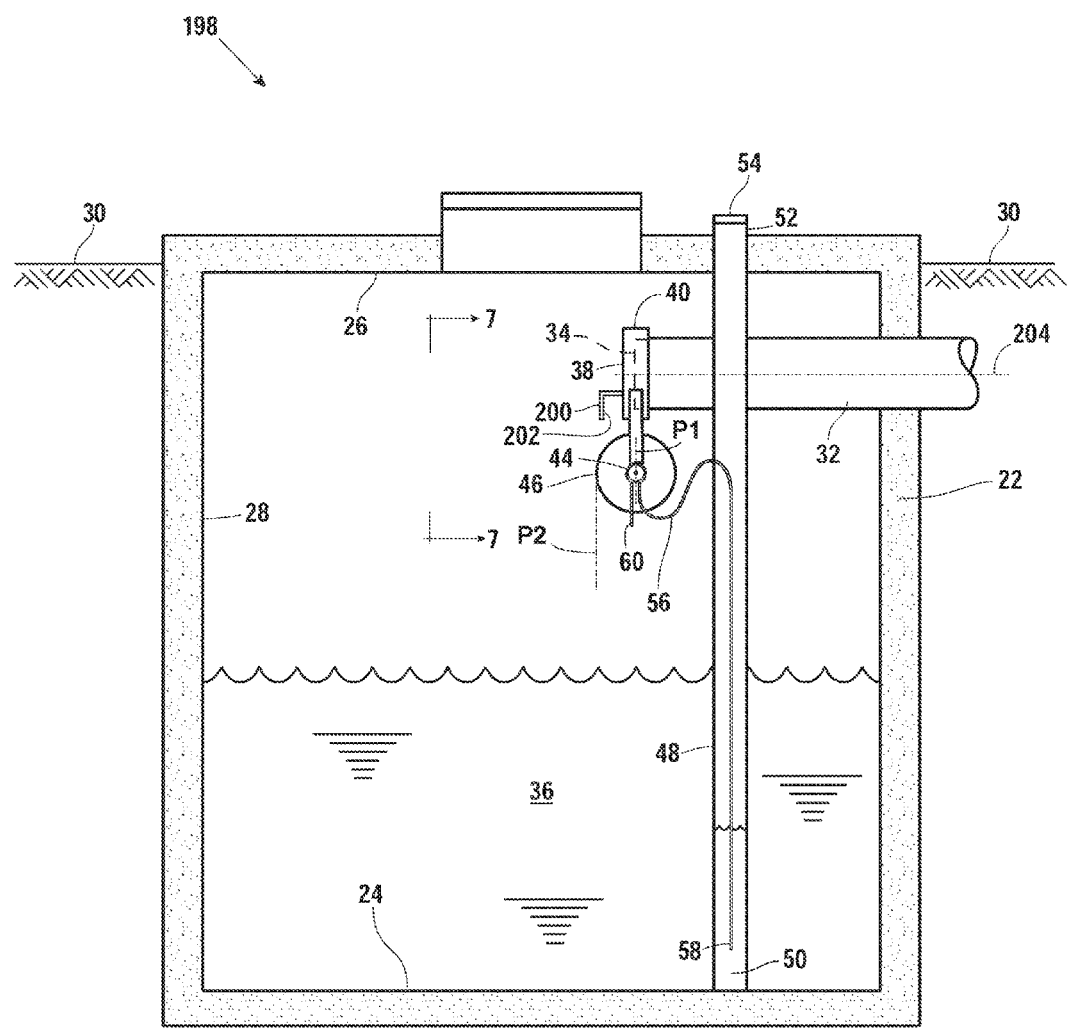
FIG. 6 is a side view of a second embodiment of the invention.
Figure 7:
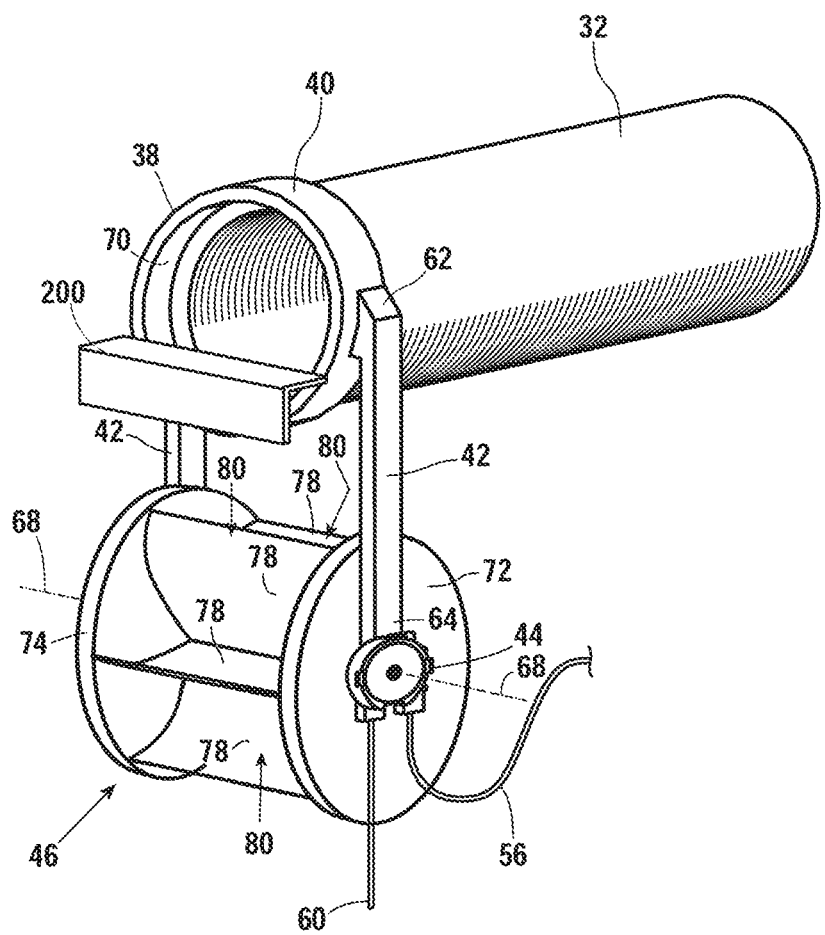
FIG. 7 is an oblique projection of the inlet pipe and rotor of the second embodiment, from view 7-7 in FIG. 6.

FIGS. 6-7 show a second embodiment 198 of the invention, which is identical to the previously-described embodiment in most respects and using identical numbering for identical elements). In addition, the embodiment 198 comprises an L-shaped baffle 200 attached (e.g., bolted, welded) to one side of the ring 40 of the mounting bracket 38. The baffle 200 presents a vertical surface 202 spaced a distance from the ring 40 between a first vertical plane P1 intersecting the axis 68 and a second vertical plane P2 tangential to the shell of revolution of the rotor 46. The vertical surface 202 is transverse to the longitudinal axis 204 of the pipe 32.

In some systems, effluent may egress from the pipe 32 at a flow rate that results in the effluent "overshooting," and thus not contacting, the rotor 46. This may occur, for example, where the volume of effluent flow is large or in systems where the effluent pipe 32 is angled downward relative to a horizontal plane. In these cases, the baffle 200 operates as an obstruction to effluent egressing from the pipe 32, which inhibits the effluent from "overshooting" the rotor 46. Instead, the egressing effluent impinges on the surface 202, removing the horizontal component of the effluent's velocity.

Other embodiments of the invention may use multiple pumps. For example, the shaft 80 may extend past both arms and a second peristaltic pump connected on the opposing side of the rotor 46 from the pump 44. In that case, a second elastomeric tube may be connected within the disinfectant volume within the container and have an end positioned above the effluent volume within the tank. Alternatively, the second elastomeric tube may be connected with a different chemical held by a second container, such as a dechlorination agent. In an alternative embodiment, two or more pumps may be "stacked" on one another and on the same side of an arm.

Figure 8:
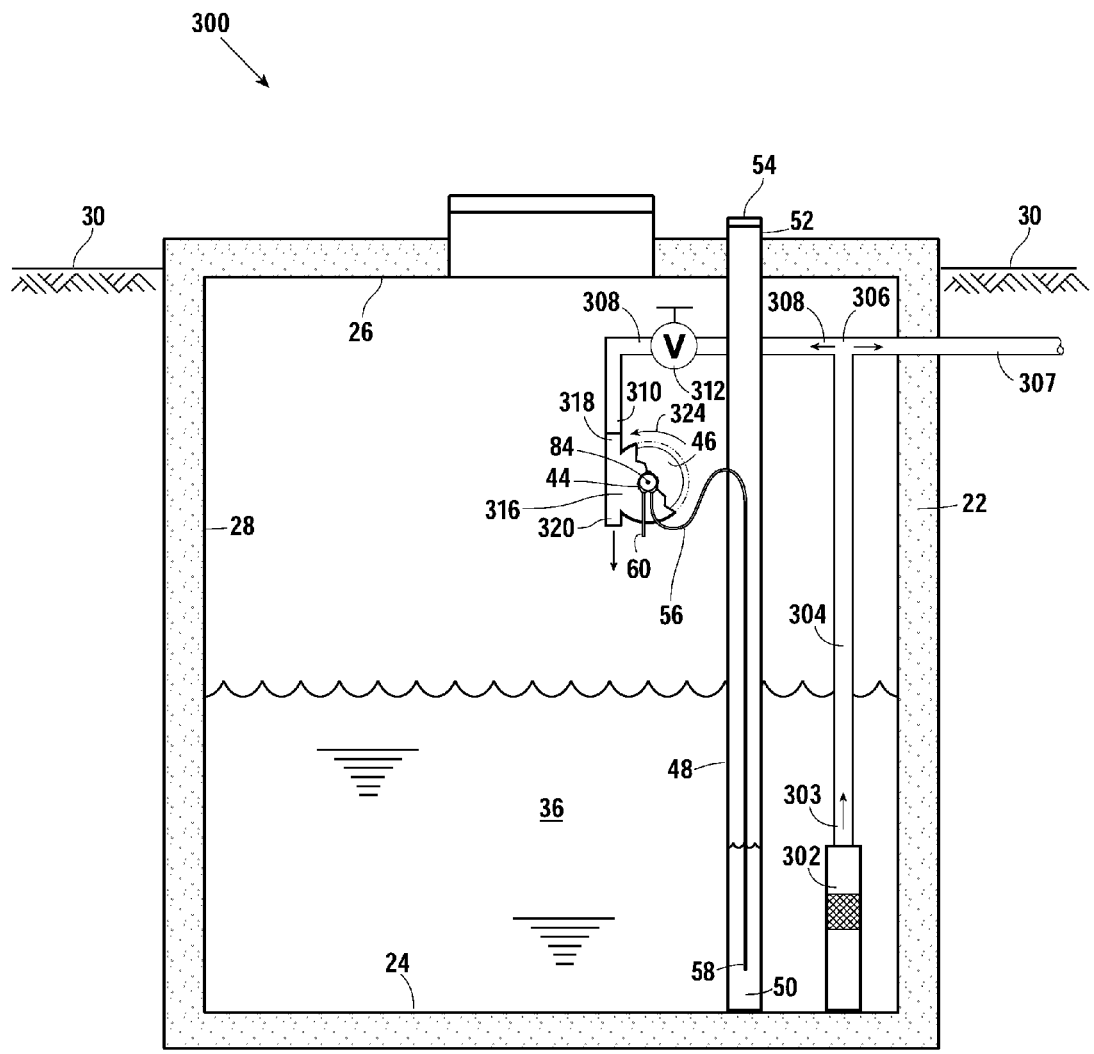
FIG. 8 is a side elevation of a third embodiment of the invention.

FIG. 8 shows another embodiment 300, which uses pressurized fluid (e.g., effluent) flow rather than gravity flow as described with respect to the previous embodiments. Identical numbers are used to for the same components previously described with respect to FIGS. 1-7.

In this embodiment 300, a pump 302 is connected to an end 303 of a pump discharge pipe 304. At another end 306 of the discharge pipe 304, a tank discharge pipe 307 extends to a position outside the tank 22 and terminates in a sprinkler head or drip system (not shown) for dispersal into at or near the surface 30. A return line 308 is also connected to the end 306 of the pump discharge pipe 304 and has an end 310 located above the effluent 36. A ball valve 312 is connected in line within the return line 308 to allow a system maintainer to control the amount of effluent that returns to the tank 22 when the pump 302 is activated.

A housing 316 has an inlet 318 connected (e.g., threaded to) to the end 310 of the return line 308 and an outlet 320. The housing 316 has a cylindrical main portion that at least substantially encloses the rotor 46. The inlet 318 and outlet 320 are connected by a fluid passage way that intersects with the shell of revolution of the rotor 46. A peristaltic pump 44 as previously described is mounted to the housing 316 and connected to the rotor 46 with by a shaft A tube 56 has an end 58 located in the chlorine volume 50 and a second end 60 in the tank 22 over the effluent 36. A portion of the tube 56 is in contact with the peristaltic pump 44 as described with reference to FIG. 5.

When the ball valve 312 is at least partially open, a portion of any pumped effluent leaves return line 308 and enters the housing 316 through the inlet 318 and passes through the housing 316 and exits through the outlet 322. As the effluent moves through the housing 316, it acts on the rotor 46 (and the connected shaft 84) to cause it to spin in a direction 324, which drives the pump 44 as previously described.

While this embodiment 300 shows the housing 316 connected to the end 310 of the return line 308, it may also be installed in line with the return line 308, regardless of whether that is in a horizontal or vertical portion thereof. Moreover, the housing 316 may be installed in the pump discharge pipe 304, the tank discharge pipe 307, or any other pressurized fluid line of the system.

The present invention is described in terms of specifically-described embodiments. Those skilled in the art will recognize that other embodiments of such a device can be used in carrying out the present invention. Other aspects and advantages of the present invention may be obtained from a study of this disclosure and the drawings, along with the appended claims.

I claim:

1. A disinfection system for use in a storage tank, the system comprising:
    a first pump having an inlet within a storage tank and an outlet fluidly connected to a discharge pipe;
    a tank discharge pipe fluidly connected to the discharge pipe;
    a return pipe having an outlet wherein the return pipe is fluidly connected to the discharge pipe;
    a housing having an inlet fluidly connected to the outlet of the return pipe, an outlet, and a fluid passage between the inlet and outlet;
    a rotor within the housing, the rotor having a shell of revolution intersecting the fluid passage;
    a shaft connected to the rotor rotationally connected to the housing;
    a second pump connected to the shaft, the second pump having a casing and a rotor assembly;
    a second container; and
    a tube having a first end within the second container and a second end outside the second container, a portion of the tube positioned within the second pump and in contact with the rotor assembly.

2. The system of claim 1 wherein the rotor comprises a plurality of blades defining chambers.

3. The system of claim 1 further comprising a valve positioned within the return pipe.

4. The system of claim 1 wherein the second container contains a liquid disinfectant.

* * * * *